United States Patent
Wallace

(10) Patent No.: US 6,170,930 B1
(45) Date of Patent: Jan. 9, 2001

(54) METHOD FOR PRODUCING GRADIENT TONAL REPRESENTATION AND A PRINTHEAD FOR PRODUCING THE SAME

(75) Inventor: David B. Wallace, Dallas, TX (US)

(73) Assignee: Compaq Computer Corporation, Houston, TX (US)

( * ) Notice: Under 35 U.S.C. 154(b), the term of this patent shall be extended for 0 days.

(21) Appl. No.: 08/917,314

(22) Filed: Aug. 25, 1997

Related U.S. Application Data

(63) Continuation of application No. 08/259,862, filed on Jun. 15, 1994, now abandoned.

(51) Int. Cl.[7] .................................................. B41J 2/01
(52) U.S. Cl. ........................................... 347/15; 358/298
(58) Field of Search .............................. 347/15, 68, 10; 358/298

(56) References Cited

U.S. PATENT DOCUMENTS

| | | | |
|---|---|---|---|
| 4,513,299 | 4/1985 | Lee et al. ............................ | 347/15 |
| 4,523,201 | 6/1985 | Liker .................................. | 347/11 |
| 4,536,097 | 8/1985 | Nilsson ........................... | 347/68 X |
| 4,554,593 | * 11/1985 | Fox .................................. | 358/282 |
| 4,635,087 | * 1/1987 | Sakurada ........................... | 347/15 |
| 4,651,287 | * 3/1987 | Tsao ................................ | 347/3 X |

(List continued on next page.)

FOREIGN PATENT DOCUMENTS

| | | | |
|---|---|---|---|
| 36 04 577 | 10/1986 | (EP) ............................ | B41M/5/00 |
| 0 225 697 | 6/1987 | (EP) ............................ | H04N/1/40 |
| 0 364 136 | 4/1990 | (EP) ............................ | B41J/2/155 |
| 0 485 241 | 5/1992 | (EP) ............................ | B41J/2/045 |
| 0 513 971 | 11/1992 | (EP) ............................ | B41J/2/045 |
| 55-113579 | 9/1980 | (JP) . | |
| 62-267150 | 11/1987 | (JP) . | |
| 4-118245 | 4/1992 | (JP) . | |

OTHER PUBLICATIONS

H. Kotera, et al., "A Poster–Size Color Ink–Jet Printing System", Proceedings of the Society for Information Display, vol. 25, No. 4, pp. 321–329 (Dec. 1982).

M. Doering, et al., "Hardcopy Reproduction of Color Videotex Images by Means of Trilevel Dot Space Modulation and Ink Jet Printing", Proceedings of the Third International Congress on Advances in Non–Impact Printing, pp. 398–410 (Aug., 1986).

(List continued on next page.)

*Primary Examiner*—John Barlow
*Assistant Examiner*—Craig A. Hallacher
(74) *Attorney, Agent, or Firm*—Sharp, Comfort & Merrett, P.C.

(57) ABSTRACT

A method of producing, on a physical medium, a gradient tonal representation of an image and a printhead for producing the same. An input image is divided into first and second regions. First, continuously variable intensity level, continuous tone and second, discretely variable intensity level, half-tone portions of the representation which respectively correspond to the first and second regions of the image are then printed by depositing selected quantities of ink on the first and second portions of the physical medium such that each pixel thereof has an ink intensity level corresponding to the image intensity level for the corresponding one of the pixels of the first region of the image. The ink is deposited on the second portion of the physical medium by depositing a spot of ink having a first diameter on selected ones of the pixels of the second portion, depositing a spot of ink having a second diameter on others of the pixels of the second portion and depositing no ink on still others of the pixels of the second portion such that the second portion of the representation has the desired ink intensity level. The color of the ink ejected may be black, in which case, the gradient tonal representation produced thereby shall be a gray scale representation, or other color such as yellow, cyan or magenta.

23 Claims, 3 Drawing Sheets

U.S. PATENT DOCUMENTS

| | | | |
|---|---|---|---|
| 4,680,645 | 7/1987 | Dispoto et al. | 358/298 |
| 4,743,924 | 5/1988 | Scardovi | 347/10 |
| 4,752,790 | 6/1988 | Scardovi | 347/10 |
| 4,879,568 | 11/1989 | Bartky et al. | 347/69 |
| 4,887,100 | 12/1989 | Michaelis et al. | 347/69 |
| 4,963,882 | 10/1990 | Hickman | 347/69 |
| 5,016,028 | 5/1991 | Temple | 347/69 |
| 5,111,302 * | 5/1992 | Chan | 347/15 X |
| 5,138,333 | 8/1992 | Bartky et al. | 347/11 X |
| 5,200,831 * | 4/1993 | Tai | 358/298 |
| 5,227,813 | 7/1993 | Pies et al. | 347/69 X |
| 5,461,403 * | 10/1995 | Wallace | 347/10 |
| 5,557,304 * | 9/1996 | Stortz | 347/15 |

OTHER PUBLICATIONS

Wallace, David B., entitled "A Method of Characteristic Model of a Drop–on–Demand Ink–Jet Device Using an Integral Method Drop Formation Model", 89–WA/FE–4 (1989).

Tsao, C.S., entitled "Drop–on–Demand Ink Jet Nozzle Array with Two Nozzles/Piezoelectric Crystal", *IBM Technical Disclosure Bulletin*, vol. 23 No. 10 (Mar. 1981).

* cited by examiner

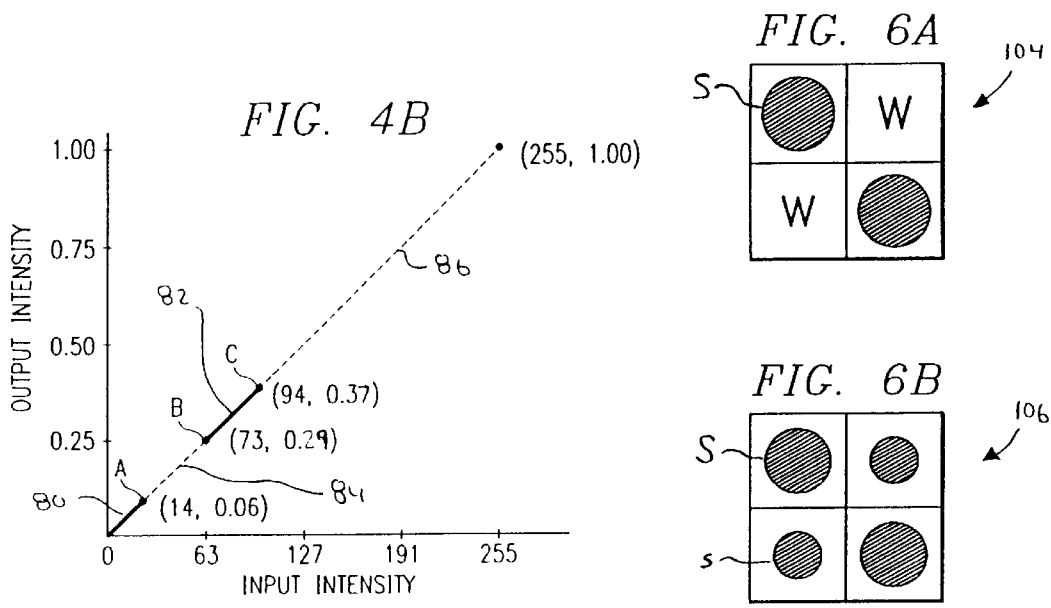
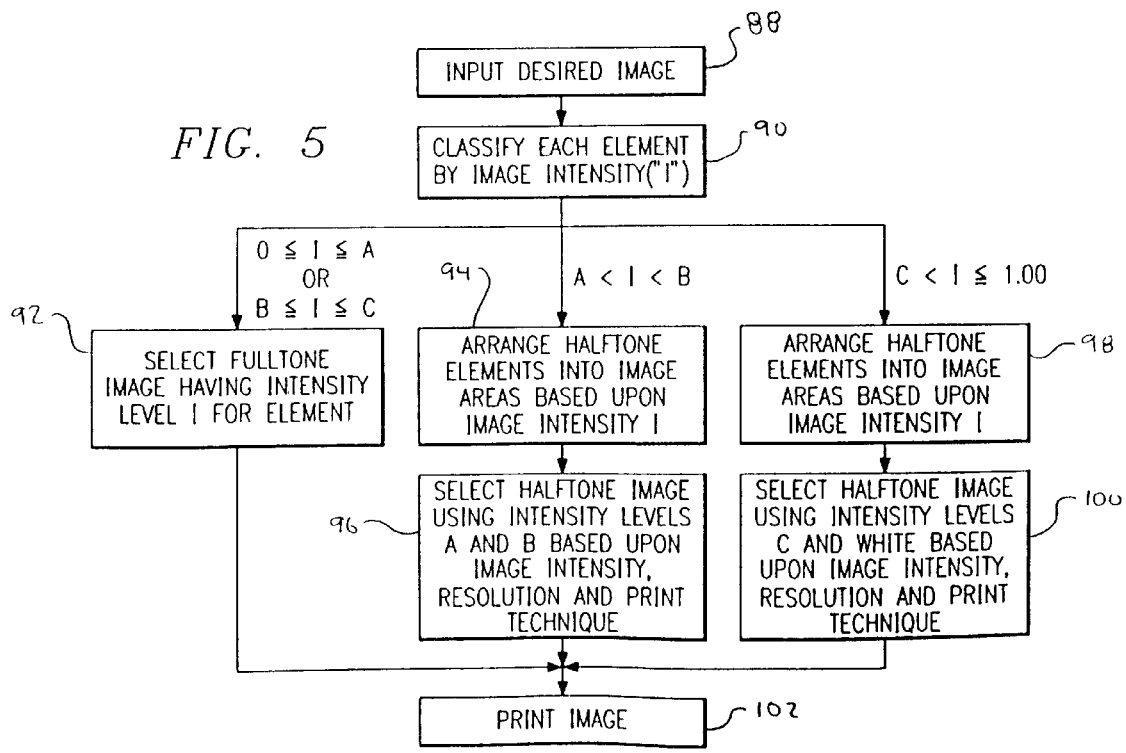

METHOD FOR PRODUCING GRADIENT TONAL REPRESENTATION AND A PRINTHEAD FOR PRODUCING THE SAME

This application is a continuation, of application Ser. No. 08/259,862, filed Jun. 15, 1994, now abandoned.

BACKGROUND OF THE INVENTION

1. Field of the Invention

The present invention generally relates to printhead apparatus and, more particularly, to a method and apparatus for producing gradient tonal representations, for example, gray scale or other gradient single color representations, of images by combining continuous and halftone printing techniques.

2. Description of Related Art

Printers provide a means of outputting a permanent record in human readable form. Typically, a printing technique may be categorized as either impact printing or non-impact printing. In impact printing, an image is formed by striking an inked ribbon placed near the surface of the paper. Impact printing techniques may be further characterized as either formed-character printing or matrix printing. In formed-character printing, the element which strikes the ribbon to produce the image consists of a raised mirror image of the desired character. In matrix printing, the character is formed as a series of closely spaced dots which are produced by striking a provided wire or wires against the ribbon. Here, characters are formed as a series of closely spaced dots produced by striking the provided wire or wires against the ribbon. By selectively striking the provided wires, any character representable by a matrix of dots can be produced.

Non-impact printing techniques is often preferred over impact printing in view of its tendency to provide higher printing speeds as well as its better suitability for printing graphics and halftone images. Non-impact printing techniques include matrix, electrostatic and electrophotographic type printing techniques. In matrix type printing, wires are selectively heated by electrical pulses and the heat thereby generated causes a mark to appear on a sheet of paper, usually specially treated paper. In electrostatic type printing, an electric arc between the printing element and the conductive paper removes an opaque coating on the paper to expose a sublayer of a contrasting color. Finally, in electrophotographic printing, a photoconductive material is selectively charged utilizing a light source such as a laser. A powder toner is attracted to the charged regions and, when placed in contact with a sheet of paper, transfers to the paper's surface. The toner is then subjected to heat which fuses it to the paper.

Another form of non-impact printing is generally classified as ink jet printing. Ink jet printing devices use the ejection of tiny droplets of ink to produce an image. The devices produce highly reproducible and controllable droplets of ink, such that an ejected droplet may be precisely directed to a location specified by digitally stored image data for deposition thereat. Most ink jet printing devices commercially available may be generally classified as either a "continuous jet" type ink jet printing device where droplets are continuously ejected from the printhead and either directed to or away from a substrate, for example, a sheet of paper, depending on the desired image to be produced or as a "drop-on-demand" type ink jet printing device where droplets are ejected from the printhead in response to a specific command related to the image to be produced and all such ejected droplets are directed to the substrate for deposition.

Many drop-on-demand type ink jet printheads utilize electromechanically induced pressure waves to produce the desired droplets of ink. In one representative configuration thereof, a drop-on-demand type ink jet printhead has a horizontally spaced parallel array of internal ink-carrying channels. These internal channels are covered at their front ends by a plate member through which a spaced series of small ink discharge orifices are formed. Each channel opens outwardly through a different one of the spaced orifices. Within such a printhead, a volumetric change in fluid contained in the internal channels is induced by the application of a voltage pulse to a piezoelectric material which is directly or indirectly coupled to the fluid. This volumetric change causes pressure/velocity transients to occur in the fluid and these are directed so as to force a small, fixed quantity of ink, in droplet form, outwardly through the discharge orifice at a fixed velocity. The droplet strikes the paper at a specified location related to the image being produced and forms an ink "spot" having a diameter directly related to the volume of the ejected droplet.

Due to their ability to produce a spot at any location on a sheet of paper, ink jet and other non-impact printers have long been contemplated as being particularly well suited to the production of continuous and halftone images. However, the ability of ink jet printers to produce continuous and half tone images has been quite limited due to the fact that most ink jet printheads can only produce droplets having both a fixed volume and a fixed velocity. As a result, ink spots produced by such droplets striking a sheet of paper are of a fixed size, typically in the range of 120 $\mu$m to 150 $\mu$m, and the same intensity. Additionally, all ink jet printheads use a fixed resolution, typically 300–400 dpi (or "dots per inch") or lower, to place droplets on a sheet of paper. In contrast, a typical high quality halftone image produced using offset printing techniques uses variable sized spots at resolutions of up to 240 dots per inch.

Due to the aforementioned limitations, ink jet printheads have heretofore utilized spot density, as opposed to spot size, when attempting to produce a gray scale image. To do so, the ink jet printhead creates various shades of gray by varying the density of the fixed size ink spots. Darker shades are created by increasing spot density and lighter shades are created by reducing spot density. Producing a gray scale image in this manner, however, reduces the spacial resolution of the printer, thereby limiting its ability to produce finely detailed images. Furthermore, the more levels added to the gray scale, the greater the resultant degradation of the printer's spacial resolution. A second proposed solution has been to direct multiple droplets at a single location on the sheet of paper to form variably sized spots. While such a method can produce the variably sized spots necessary to produce a gray scale image, such a technique tends to reduce the operating speed of the printer to an unacceptably low level. Furthermore, this technique may also produce elongated or elliptical dot patterns.

It can be readily seen from the foregoing that it would be desirable to provide a method and associated printing apparatus capable of producing a gray scale or other gradient tonal representation of an image. It is, therefore, an object of the present invention to provide such an improved drop-on-demand type ink jet printhead.

SUMMARY OF THE INVENTION

In one embodiment, the present invention is of a method of producing, on a physical medium, a gradient tonal representation of an image in which the image is divided into first and second regions. First, continuously variable intensity level and second, discretely variable intensity level portions of the representation which correspond to the first and second regions of the image are then printed. The steps of printing the first and second portions of said representation may further include the steps of printing continuous and halftone representations of the first and second regions of the image, respectively. The image is comprised of a plurality of pixels and, in one aspect thereof, the image may be divided into the first and second regions by determining an intensity level for each pixel of the image and assigning each of the pixels to either the first or second region based upon its intensity level. Each pixel may be assigned to the first region if its intensity level is within a range for which a continuously variable level representation may be printed and to the second level if its intensity level is within a range for which a discretely variable intensity level representation may be printed.

In further aspects thereof, the continuously variable intensity level portion of the representation may be produced by depositing a selected quantity of ink on the first portion of the physical medium such that each pixel thereof has an ink intensity level corresponding to the image intensity level for the corresponding one of the pixels of the first region of the image and the discretely variable intensity level portion of the representation may be produced by depositing ink on the second portion of the physical medium such that the second portion has an ink intensity level corresponding to the determined image intensity level for the corresponding portion of the second region of the image. The ink may deposited on the second portion of the physical medium by depositing a spot of ink having a first diameter on selected ones of the pixels of the second portion and a spot of ink having a second diameter on others of the pixels of the second portion such that the second portion of the representation has the desired ink intensity level. The color of the ejected ink may be black, in which case, the gradient tonal representation produced thereby shall be a gray scale representation, or other color such as yellow, cyan or magenta.

In another embodiment, the present invention is of a method of producing, on a physical medium, a gradient tonal representation of an image. An image intensity level is determined for each pixel of the image and each corresponding pixel of the representation is assigned to a first portion thereof if the image intensity level is within a first range and to a second portion thereof if the image intensity level is within a second range. From a continuously variable range of quantities, a quantity of ink to be deposited on each pixel of the representation is selected and a continuous tone portion of the representation generated by depositing the selected quantities of ink on each of the pixels of the first portion of the representation. Certain ones (or all) of the pixels of the second portion of the representation are then selected to have ink deposited thereon. From a discretely variable range of quantities, a quantity of ink to be deposited on each selected pixel of the second portion of the representation is selected and a half-tone portion of the representation generated by depositing the selected quantity of ink on each of the selected pixels of the second portion of the representation. In one aspect thereof, the selected quantity is deposited on each selected pixel by depositing a spot of ink having a first diameter on certain ones, a spot of ink having a second diameter on others and/or no ink spot on still others of the selected pixels of the second portion of the representation. The color of the ejected ink may be black, in which case, the gradient tonal representation produced thereby shall be a gray scale representation, or other color such as yellow, cyan or magenta.

In yet another embodiment, the present invention is of a printhead for producing a gradient tonal representation of an image on a physical medium. The printhead includes means for forming, for a first portion of the image having an image intensity within a first image intensity range, a continuous tone representation of the first portion of the image on the physical medium and means for forming, for a second portion of the image having an image intensity within a second image intensity range, a half-tone representation of the second portion of the image on the physical medium. In one aspect thereof, the means for forming a continuous tone representation of the first portion of the image further includes means for producing, at selected locations for the continuous tone representation, a spot of ink having a volume selectable from a first continuously variable range of values and, in another aspect thereof, the means for forming a half-tone representation of the second portion of the image further comprises means for producing, at selected locations for the half-tone representation, a spot of ink having a volume selectable between first and second discrete values outside the continuously variable range of values. In a further aspect thereof, the means for forming a continuous tone representation of the first portion of the image may further include means for generating a spot of ink having a size selectable from a second continuously variable range of values in which the first discrete value forms an upper boundary for the first continuously variable range of values and the second discrete value forms a lower boundary for the second continuously variable range of values.

In still yet another embodiment, the present invention is of a drop-on-demand ink jet printhead for producing a gradient tonal representation of an image on a physical medium. The ink jet printhead includes means for forming, for a first portion of the image having an image intensity within a first image intensity range, a continuous tone representation of the first portion of the image on the physical medium and means for forming, for a second portion of the image having an image intensity within a second image intensity range, a half-tone representation of the second portion of the image on the physical medium. In one aspect thereof, the means for forming a continuous tone representation of the first portion of the image further includes means for generating a droplet of ink having a volume selectable from a first continuously variable range of values and, in another aspect thereof, the means for forming a half-tone representation of the second portion of the image further comprises means for generating a droplet of ink having a volume selectable between first and second discrete values outside the continuously variable range of values. In a further aspect thereof, the means for forming a continuous tone representation of the first portion of the image may further include means for generating a droplet of ink having a volume selectable from a second continuously variable range of values in which the first discrete value forms an upper boundary for the first continuously variable range of values and the second discrete value forms a lower boundary for the second continuously variable range of values. The color of the ink ejected may be black, in which case, the gradient tonal representation produced thereby shall be a gray scale representation, or other color such as yellow, cyan or magenta.

In another embodiment thereof, the present invention is of a drop-on-demand ink jet printhead for producing a gradient tonal representation of an image on a physical medium which includes a main body portion having an ink-carrying channel extending therethrough. Further provided are means for ejecting, from the ink-carrying channel, droplets of ink capable of forming a continuous tone representation of a first portion of the image on the physical medium. The droplets have a volume which may be selected from a first continuously variable range. The ink jet printhead is further provided with means for ejecting, from the ink-carrying channel, droplets of ink capable of forming a half-tone representation of a second portion of the image on the physical medium. These droplets have a volume selectable between first and second discrete values outside the first continuously variable range of values. In one aspect thereof, the means for ejecting droplets of ink having a volume which may be selected from the first continuously variable range may be comprised of a piezoelectric actuator acoustically coupled to the ink-carrying channel and means for applying a first selected voltage to the piezoelectric actuator for a first selected period of time to cause a deflection of the piezoelectric actuator. The deflection of the piezoelectric actuator generates a pressure wave in the channel which causes the ejection of a droplet of ink having the volume within the first continuously variable range. In a further aspect thereof, the means for ejecting droplets of ink having a volume which may be selected from the first discrete value or the second discrete value further comprises means for applying a second selected voltage to the piezoelectric actuator for a second selected period of time to cause a deflection of the piezoelectric actuator. The deflection of the piezoelectric actuator generates a pressure wave in the channel which causes the ejection of a droplet of ink having the volume at the first discrete value or the second discrete value. The color of the ink ejected thereby may be black, in which case, the gradient tonal representation produced thereby shall be a gray scale representation, or other color such as yellow, cyan or magenta.

BRIEF DESCRIPTION OF THE DRAWING

FIG. 4B is a graphical relationship between intensity of an image and intensity of a representation of the image produced by the ink jet printhead of FIGS. 1–2;

FIG. 5 is a flowchart of a method for producing gradient tonal representations by combining continuous and halftone printing techniques in accordance with the teachings of the present invention;

FIG. 6A is an enlarged view of a four pixel area of a half-tone representation produced using a dither matrix technique and uniformly sized spots; and FIG. 6B is an enlarged view of a four pixel area of a half-tone portion of a gradient tonal representation produced using non-uniformly sized spots in accordance with the teachings of the present invention.

DETAILED DESCRIPTION

Figure 1:
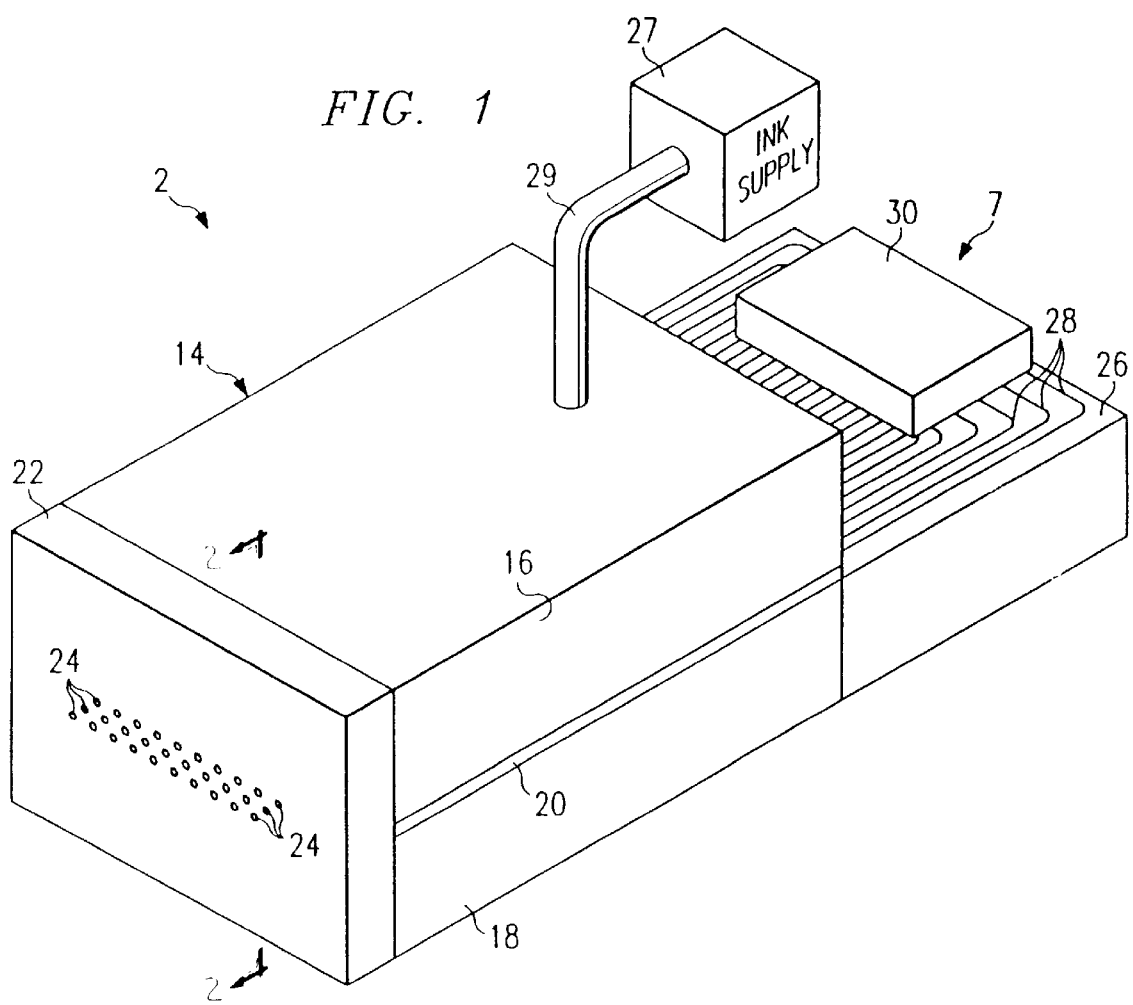
FIG. 1 is a perspective view of a specially designed, drop-on-demand ink jet printhead which is constructed in accordance with the teachings of the present invention and configured for the generation of gray scale or other gradient tonal representations of images.

Referring now to the drawing where like reference numerals designate the same or similar elements throughout the several views, in FIG. 1, a drop-on-demand ink jet printhead 2 may now be seen. The ink jet printhead 2 has a body 14 having upper and lower rectangular portions 16 and 18, with an intermediate rectangular body portion 20 secured between the upper and lower portions 16 and 18 in the indicated aligned relationship therewith. A front end section of the body 14 is defined by an orifice plate member 22 having a spaced series of small ink discharge orifices 24 extending rearwardly therethrough. As shown, the orifices 24 are arranged in horizontally sloped rows of three orifices each.

The printhead body portions 16,20 are shorter than the body portion 18, thereby leaving a top rear surface portion 26 of the lower printhead body portion 18 exposed. For purposes later described, a spaced series of electrical actuation leads 28 are suitably formed on the exposed surface 26 and extend between the underside of the intermediate body portion 20 and a controller portion 30 of the drive system 7 mounted on the surface 26 near the rear end of the body portion 18.

Figure 2:
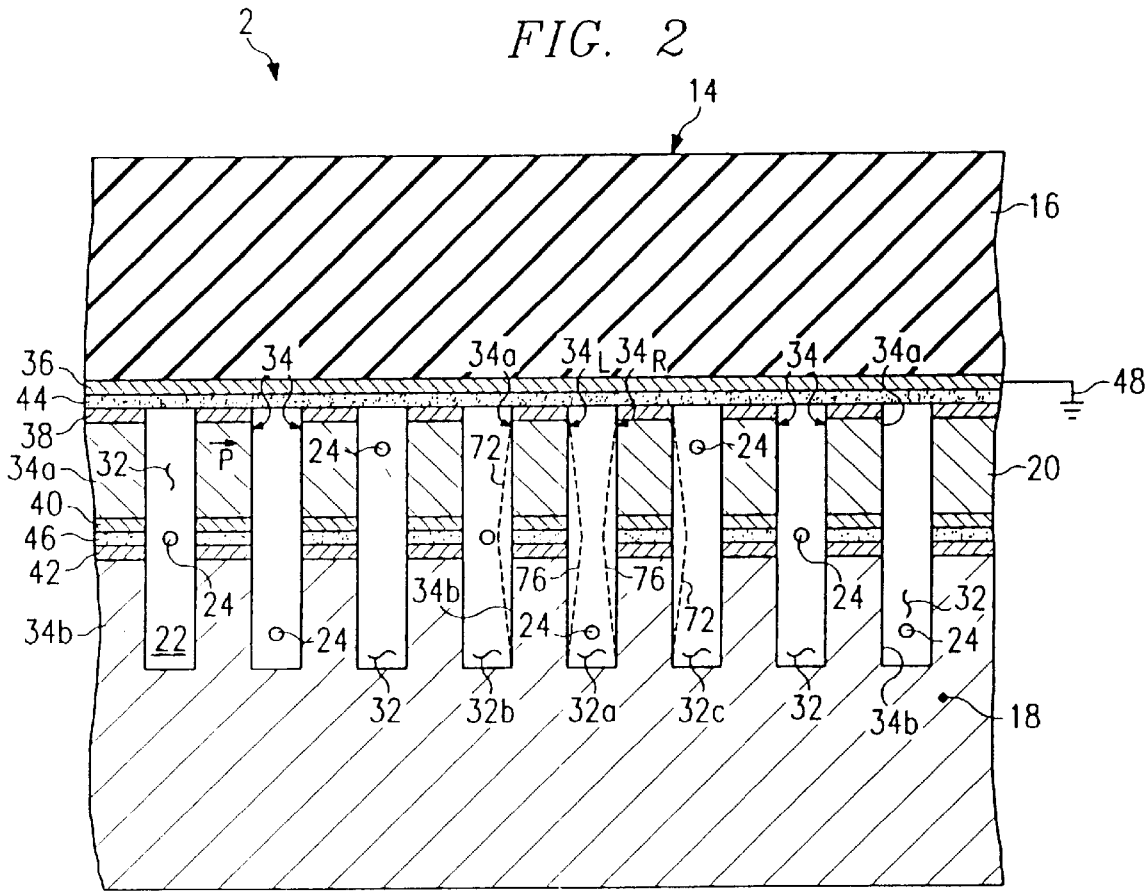
FIG. 2 is an enlarged scale, partial cross-sectional view through the ink jet printhead taken along line 2—2. of FIG. 1 and illustrating a plurality of piezoelectrically actuated ink-carrying channels suitable for ejecting droplets of ink therefrom.

Referring now to FIG. 2, a plurality of vertical grooves of predetermined width and depth are formed in the printhead body portions 18 and 20 to define within the printhead body 14 a spaced, parallel series of internal ink receiving channels 32 that longitudinally extend rearwardly from the orifice plate 22 and open at their front ends outwardly through the orifices 24. The channels 32 are laterally bounded along their lengths by opposed pairs of a series of internal actuation sidewall sections 34 of the printhead body.

Sidewall sections 34 have upper parts 34a defined by horizontally separated vertical sections of the body portion 20, and lower parts 34b defined by horizontally separated sections of the body portion 18. The underside of the body portion 16, the top and bottom sides of the actuation sidewall section parts 34a, and the top sides of the actuation sidewall section parts 34b are respectively coated with electrically conductive metal layers 36, 38, 40 and 42.

Body portions 16 and 20 are secured to one another by a layer of electrically conductive adhesive material 44 positioned between the metal layers 36 and 38, and the upper and lower actuator parts 34a and 34b are intersecured by layers of electrically conductive material 46 positioned between the metal layers 40 and 42. The metal layer 36 on the underside of the upper printhead body portion 16 is connected to ground 48. Accordingly, the top sides of the upper actuator parts 34a are electrically coupled to one another and to ground 48 via the metal layers 38, the conductive adhesive layer 44 and the metal layer 36.

Each of the channels 32 is filled with ink received from a suitable ink supply reservoir 27 (see FIG. 1) connected to the channels via an ink delivery conduit 29 connected to an ink supply manifold (not shown) disposed within the printhead body 14 and coupled to rear end portions of the internal channels 32. In a manner subsequently described, each horizontally opposed pair of the sidewall actuators 34 is piezoelectrically deflectable into and out of their associated channel 32, under the control of the drive system 7, to force ink (in droplet form) outwardly through the orifice 24 associated with the actuated channel.

Figure 3:
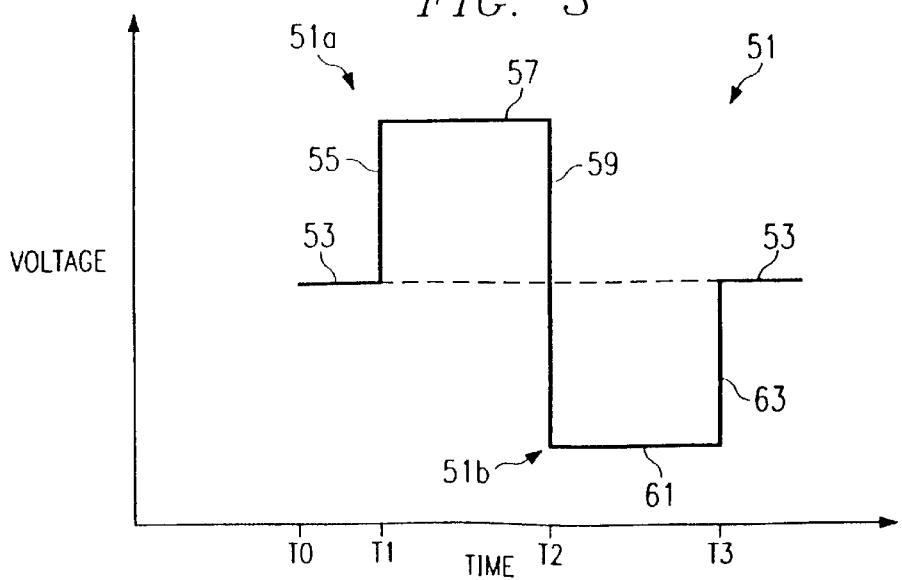
FIG. 3 is a schematic illustration of a voltage waveform suitable for application to the piezoelectrically actuated ink-carrying channels of FIG. 3 to cause the ejection of droplets of ink therefrom.

Referring next to FIG. 3, the voltage waveform to be applied to a horizontally opposed pair of sidewall actuators 34 to force the ejection of a droplet of ink out of their associated channel 32 will now be described in greater detail. The voltage waveform 51, also referred to as an "echo pulse" waveform, includes primary and echo portions 51a, 51b which generate a pressure wave in an ink-carrying channel of the ink jet printhead 2 to cause the ejection of a droplet of ink, the volume of which may be readily modulated, in a manner more fully described below. In turn, when striking a sheet of paper, the modulatable volume droplets of ink produce modulatable size spots capable of producing a gradient tonal representation, such as a gray scale, in a manner to be more fully described below.

From a rest state 53, during which a rest state voltage is applied across a piezoelectric actuator 34 and the actuator remains in a undeflected rest position, the voltage waveform 53 begins a first rapid rise 55 at time $T_1$ to a first or peak voltage to be applied across the piezoelectric actuator 34. The first rapid rise 55 in the voltage waveform 53 causes the piezoelectric actuator 34 to move to a first, outwardly deflected position, thereby producing an expansive pressure wave that begins to propagate both forwardly and rearwardly through an ink-carrying channel 32 partially defined thereby.

Once reaching the peak value, the voltage waveform 53 enters a primary dwell state 57 which extends from time $T_1$ to time $T_2$. During the primary dwell state 57, the voltage is held constant at the first value to hold the piezoelectric actuator 34 in the deflected position. While the voltage waveform 51 is held in the dwell state 57, the rearwardly propagating negative pressure wave will have deflected off the back wall of the printhead 2 and propagated forwardly within the channel 32 to its origination point. When the forwardly propagating reflected pressure wave reaches its origination point at time $T_2$, the voltage waveform 51 begins a rapid fall 59 during which the voltage drops below the rest voltage (thereby ending the primary portion 51a and beginning the echo portion 51b of the voltage waveform 51) to a second, lower value. During the fall 59, the voltage applied across the piezoelectric actuator 34 drops to the second value, thereby causing the piezoelectric actuator 34 to move, from the first, outwardly deflected position, past the rest position, and into a second, inwardly deflected position which compresses the channel 32. By compressing the channel 32, the piezoelectric actuator 34 imparts a positive pressure wave into the channel which reinforces the forwardly propagating, reflected pressure wave.

Once reaching the second, lower value, the voltage waveform 51 enters an echo dwell state 61 which extends from time $T_2$ to time $T_3$. During this state, the voltage is held constant at the second value to hold the piezoelectric actuator 34 in the second, channel compressing, deflected position. While the voltage waveform 51 is held in the echo dwell state 61, the forwardly propagating reinforced pressure wave will propagate towards the orifice 24. At time $T_3$, the voltage waveform 51 will begin a second rapid rise 63 which will return the voltage waveform 51 to the rest state 53, thereby ending the echo portion 51b of the voltage waveform 51. The piezoelectric actuator 34 will move from the second, channel compressing, deflected position to the rest position, thereby imparting a negative pressure wave into the channel 32. This negative pressure wave acts as an active pull-up which prematurely terminates the droplet formation process by the forwardly propagating reinforced pressure pulse. Having returned to the rest state, the voltage waveform 51 remains at this state to allow the pressure pulse within the channel 34 to dissipate over time. In an exemplary embodiment of the invention, the rest, first and second voltages may be 0, +20 and −20 volts, respectively, and the dwell and echo dwell times may both be 10 μsec. It is specifically contemplated, however, that numerous other values other than those specifically disclosed herein may be used for the rest, first and second voltages. It is further contemplated that durations for the dwell and echo dwell times other than those specifically disclosed herein may also be used.

Using the drive system 7, a selected one or more of the ink receiving channels 32 may be actuated to drive a quantity of ink therein, in droplet form, outwardly through the associated ink discharge orifice(s) 24. To illustrate the operation of the drive system 7, the actuation of a representative channel 32a will now be described in conjunction with FIGS. 1–3. Prior to the actuation of the channel 32a, its horizontally opposed left and right sidewall actuators $34_L$ and $34_R$ are (at time $T_O$ in FIG. 3) in initial, laterally undeflected (or "rest") positions indicated by solid lines in FIG. 2. To initiate the channel actuation cycle, the drive system 7 is operated to impose upon the left sidewall actuator $34_L$ a constant positive DC voltage pulse (i.e. the primary portion 51a) during the time interval $T_1$–$T_2$ shown in FIG. 3. Simultaneously therewith, the drive system 7 is further operated to impose upon the right sidewall actuator $34_R$ an equal constant negative DC voltage pulse during the time interval $T_1$–$T_2$. These opposite polarity DC voltage pulses transmitted to the sidewall actuators $34_L$ and $34_R$ outwardly deflect them away from the channel 32a being actuated and into the outwardly adjacent channels 32b and 32c as indicated by the dotted lines 72 in FIG. 2, thereby imparting respective compressive pressure pulses to the channels 32b and 32c and expansive pressure pulses to the channel 32a.

Next, at time $T_2$, the positive voltage pulse transmitted to sidewall actuator $34_L$ and the corresponding negative voltage pulse on the sidewall actuator $34_R$ are terminated, and the drive system 7 is operated to simultaneously impose a constant negative DC voltage pulse (i.e. the echo portion 51b) on the left sidewall actuator $34_L$, while imposing an equal constant positive DC voltage pulse on actuator $34_R$, during the time interval $T_2$–$T_3$. These opposite polarity constant DC voltage pulses inwardly deflect the sidewall actuators $34_L$ and $34_R$ past their initial undeflected positions and into the channel 32a as indicated by the dotted lines 76 in FIG. 2, thereby simultaneously imparting respective compressive pressure pulses into the channel 32a. Such inward deflection of the actuators $34_L$ and $34_R$ reduces the volume of channel 32a, thereby elevating the pressure of ink therein to an extent sufficient to force a quantity of the ink, in droplet form, outwardly through the orifice 24 associated with the actuated channel 32a.

The size of ink spots formed on a sheet of paper when struck by a droplet of ink ejected in the manner described above will vary depending on the volume of ink contained in the droplet ejected by the selected channel 32a. More specifically, by applying the voltage waveform 51 having a primary portion 51a having a selected positive peak value and extending for a first selected time period and an echo portion 51b having a selected negative peak portion and extending for a second selected time period to the sidewall actuators $34_L$ and $34_R$ defining the channel 32a to be actuated, a droplet of ink will be ejected which contains a volume of ink which, when striking the sheet of paper, will form a spot having the selected spot size. Such spot size modulation may be achieved by selecting positive and negative peak values and varying the dwell and echo dwell times during which the selected peak values are applied to the sidewall actuators $34_L$ and $34_R$.

Figure 4A:
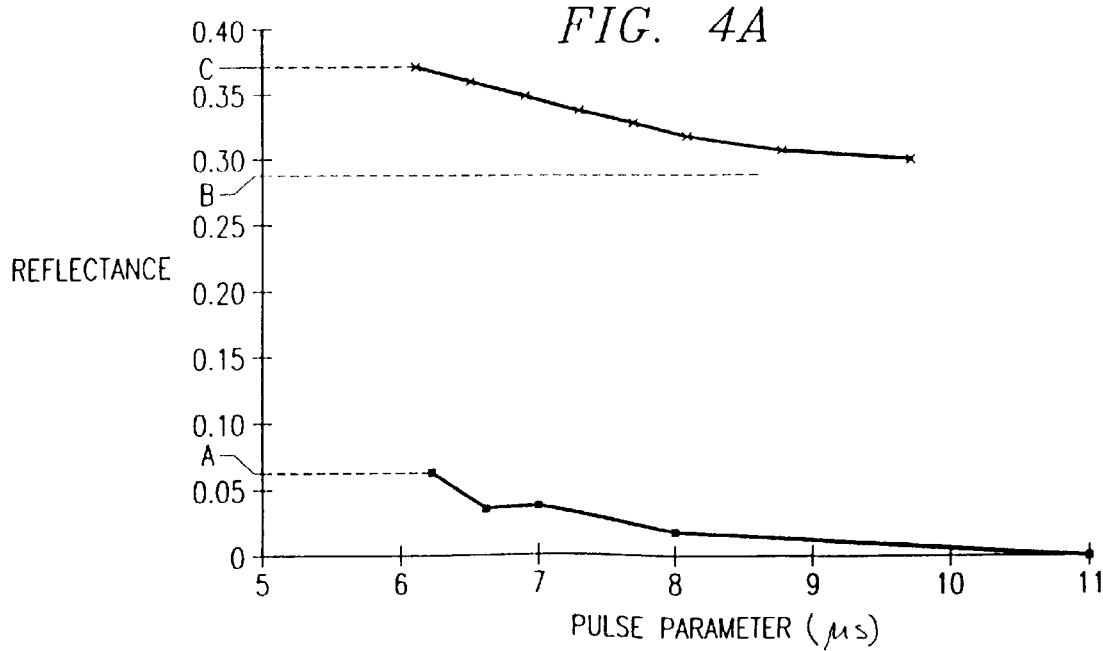
FIG. 4A is a graphical illustration of the relationship between reflectance of a spot produced by a droplet of ink ejected by the ink jet printhead of FIGS. 1–2 and pulse length of the voltage waveform of FIG. 3 used to eject the droplet of ink.

Referring next to FIG. 4A, the relationship between spot size and pulse width for the primary and echo portions 51a, 51b of the voltage waveform 51 may now be seen. In FIG. 4A, pulse width is plotted against reflectance. Reflectance is a measure of the relative intensity of the representation produced by the ink jet printhead 2 wherein a reflectance of 0.0 is considered "full ink color" and a reflectance of 1.0 is considered "white". As, for an representation formed by depositing a single ink spot in each one of a plurality of pixel elements, reflectance is directly proportional to the size of the ink spot deposited within the pixel element of a representation, reflectance is directly related to spot size.

In the example illustrated herein, the channel 32a of the ink jet printhead 2 was fired by applying equal duration primary and echo pulses to the sidewall actuators $34_L$ and $34_R$. As may be seen in FIG. 4A, by varying the duration of the primary and echo portions of the echo pulse applied to the sidewall actuators $34_L$ and $34_R$ between approximately 6.2 and approximately 9.8 μs, the reflectance (or intensity) and, therefore, the size of the ink spot produced thereby, is varied such that the reflectance thereof will range between 0.37 (point C) to 0.29 (point B). This range of spot sizes is herein defined as a first "continuously variable" range for the reason that, by varying the pulse duration between these values, the size of the ink spot produced thereby may be varied such that the reflectance thereof will range between 0.29 and 0.37. This ability to continuously vary spot size between 0.29 and 0.37 is particularly useful in producing a continuous tone representation of an image. To produce a continuous tone representation of an image, or a portion thereof, in which the image intensity is varied between 0.29 and 0.37, the pulse width applied to the sidewall actuators $34_L$ and $34_R$ are modulated between 6.2 and 9.8 μsec so that the droplets of ink are ejected from the channels 32 have sufficient volume such that an ink spot having the desired size/intensity is deposited on each pixel element of the representation.

As may be further seen in FIG. 4A, a second continuously variable range of spot size/intensity may be achieved by "double spotting", applying, preferably in sequence, a pair of echo pulses to a channel while the physical medium remains in a stationary position relative to the ink jet printhead 2 such that a pair of ink droplets strike the target pixel. By modulating the pulse between about 6.2 μsec and about 11 μsec while maintaining the physical medium in a stationary position relative to the ink jet printhead so that two droplets of ink strike the same pixel, the size of the ink spot produced thereby, is varied such that the resultant reflectance will range between 0.06 (point A) to 0.00. This range of spot sizes is herein defined as a second "continuously variable" range for the reason that, by varying the pulse duration between these values, any spot size between 0.06 and 0.00 may be produced. As before, this ability to continuously vary spot size between 0.06 and 0.00 improves the aforementioned ability to produce a continuous tone representation of an image, or a portion thereof, in that the range of image intensity for which the ink jet printhead 2 may be used to produce a continuous tone representation of an image is expanded.

As herein described, the ink jet printhead 2 is capable of producing a continuous tone representation of an image if the desired intensity of the representation is between 0.00 and 0.06 or between 0.29 and 0.37. However, outside of these ranges are gap ranges which includes numerous image intensity levels for which the ink jet printhead 2 cannot produce a continuous tone representation. More specifically, the ink jet printhead cannot produce a continuous tone representation of an image, or portion thereof, having an image intensity level "I" within the range 0.06<I<0.28 or the range 0.37<I<1.00. For an image, or portion thereof, having an intensity level within these gap ranges, the ink jet printhead 2 is configured to produce a half-tone representation in accordance with the method described below.

Specifically, to produce a representation having an image intensity between 0.06 and 0.29, a first group of droplets having a volume such that the spots produced thereby will have intensity of 0.06 are directed to a first set of selected locations within that portion of the representation to have an image intensity level between 0.06 and 0.29 and a second group of droplets having a volume such that the spots produced thereby will have an intensity of 0.29 are directed to a second set of selected locations within that portion of the representation such that the resultant representation has the desired image intensity level or levels. The production of a representation having one or more intensity levels between lower and upper bounds (in the example illustrated herein 0.06 and 0.29, respectively) by depositing spots of either the first or second size at various locations is herein defined as the formation of a representation of an image using a "discretely variable intensity level". Similarly, to produce a representation, or a portion thereof, having an image intensity level between 0.37 and 1.00, a group of droplets having a volume such that the spots produced thereby will have an intensity of 0.37 are directed to selected locations within that portion of the representation such that the resultant representation, or portion thereof, will again have the desired image intensity.

Referring next to FIG. 4B, the relationship between input and output intensity levels for the ink jet printhead 2 will now be described in greater detail. As before, a "full color" image has an intensity of 0.00 while a "white" image has an intensity of 1.00. A printer divides this range into a series of levels, for example, 256 levels. Then, when producing a representation of a 256 level image input thereto, the printer ejects droplets of ink at selected locations of a physical medium so that the resultant representation has one or more intensity levels which corresponds to the intensity levels of the input image.

By varying the pulse parameter in combination with the selective use of single or double spotting, the ink jet printhead 2, in response to the receipt of a 256 level input image, can produce a continuous tone representation of the input image having a first continuously variable range 80 which extends between image intensity levels 0 and 14 and a second continuously variable range 82 which extends between image intensity levels 73 and 94. For a first discretely variable range 84 which extends between image intensity levels 14 and 73, an output image is produced by depositing spots of sizes 0.06 and 0.29 at selected pixels of the representation. Finally, for a second discretely variable range 86 which extends between image intensity levels 94 and 255, an output representation is produced by depositing spots have size 0.37 at selected pixels of the representation.

Referring next to FIG. 5, the method of producing a gradient tonal representation will now be described in greater detail. Commencing at step 88, an image is input to a printing system, for example, an ink jet printer having the spot size modulation capability described above. The input image is comprised of a plurality of picture elements (or "pixels"), each having an intensity level between 0 and 255. Proceeding to step 90, each pixel is classified depending on its image intensity level I. For the embodiment of the invention described herein, the pixels would be subdivided into first, second and third groups, depending on the image intensity level for that group. Specifically, pixels having image intensities between 0 and 14 and between 73 and 94 would be placed in the first group, pixels having image intensities greater than 14 but less than 73 would be placed in the second group and pixels having image intensities greater than 94 would be placed into the third group.

Proceeding to step 92, those pixels having image intensities between 0 and 14 or 73 or 94 would be selected for continuous tone printing in a first portion of the representation comprised of selected pixels of the representation corresponding to the pixels of the image having the aforementioned image intensity levels. At step 94, those pixels having an image intensity level greater than 14 but less than 73 are arranged into a second image area. Proceeding to step 96, and based upon the image intensity, the desired resolution of the representation to be produced and the printing technique utilized to produce the representation, a half-tone representation comprised of spots having intensity levels 0.06 and 0.28 would be configured.

Similarly, at step 98, those pixels having an image intensity level greater than 0.37 would be arranged into a third image area and, at step 100, a half-tone representation comprised of spots having intensity level 0.37 is configured based upon the image intensity, the desired resolution of the representation to be produced and the printing technique utilized to produce the representation. Finally, at step 102, the first, second and third portions of the representation are combined and the desired representation of the image printed by the ink jet printhead 2.

Referring next to FIGS. 6A–B, one of the print techniques suitable for use in conjunction with the methods described herein will now be described in greater detail. In FIG. 6A, a four pixel region 104 of a half-tone representation printed using a dither matrix technique may be seen. In this technique, ink spots are deposited on selected pixels of the region 104 while no ink is deposited on the remaining pixels (designated in FIG. 6A as "W" areas. By selectively depositing ink spots within the region 104, the resultant representation will have a desired image intensity level. Since spots may be produced in a single size, there are only 5 intensity levels available for the region 104. These are WWWW, WWWS, WWSS (illustrated in FIG. 6A), WSSS and SSSS. Of course, should the region 104 be enlarged, for example, to 16 pixels, additional intensity levels would be available. To do so, however, would significant degrade the resolution of the region 104.

In FIG. 6B, on the other hand, a four pixel region 106 of a representation produced using the discretely variable printing technique disclosed herein wherein ink spots having either a first or a second size may be directed to selected pixels within the region 106. As the size of the ink spot deposited onto a selected pixel may be discretely varied between first and second sizes, a significantly greater number of image intensity levels are possible. Specifically, for the four pixel region 106 illustrated in FIG. 6B, 15 intensity levels are available. These are WWWW, WWWs, WWWS, WWss, WWSS, WWsS, Wsss, WssS, WsSS, WSSS, ssss, sssS, ssSS, sSSS and SSSS. Thus, for a given printing technique and resolution level, a significantly greater number of intensity levels are possible by application of the present invention.

Thus, there has been described and illustrated herein, a method for producing a representation of an image on a physical medium and an associated piezoelectrically actuated ink jet printhead which produces a representation of an image by combining the generation of a first portion of the representation using a continuously variable printing technique and a second portion of the representation using a discretely variable printing technique. In this manner, an improved representation may be achieved by utilization of the printing techniques combining continuously and discretely variable printing described herein. It should be clearly understood, however, that while a single printing technique (dither matrix) and a single type of printer (drop-on-demand ink jet printer) have been disclosed, the techniques described herein are equally applicable to a wide array of both printing techniques and printers. Accordingly, the foregoing detailed description is to be clearly understood as being given by way of illustration and example only, the spirit and scope of the present invention being limited solely by the appended claims.

What is claimed is:

1. A method of producing a gradient tonal representation of an image on a physical medium using ink dot printing, comprising the steps of:

printing representations of image areas having intensities within a first, continuously variable, defined intensity level range by forming at respective dot locations, ink dots each having an intensity level that is selectively and continuously variable over a range representing said first defined intensity level range, by adjusting individual ink dot sizes over a continuous range of dot sizes d1 to d2;

printing representations of image areas having intensities within a second, continuously variable, defined intensity level range by forming at respective dot locations, ink dots each having an intensity level that is selectively and continuously variable over a range representing said second defined intensity level range, by adjusting individual ink dot sizes over a continuous range of dot sizes d3 to d4; and printing representations of image areas having intensities within a third, discretely variable intensity level range intermediate the first and second intensity level ranges by forming at respective dot locations, ink dots each having a size selected from a predetermined number of discrete size values that are either not greater than d1 or not less than d3;

wherein, in sequence, said first, third, and second intensity level ranges represent image areas of increasing intensity levels and the dot sizes increase from d1 to d2 to d3 to d4.

2. A method of producing a gradient tonal representation of an image on a physical medium according to claim 1 wherein the steps of printing a first and second, continuously variable intensity level, portions of said representation further comprise the steps of printing, as said first and second portions of said representation, continuous tone representations of said image.

3. A method of producing a gradient tonal representation of an image on a physical medium according to claim 2 wherein the step of printing a third, discretely variable intensity level, portion of said representation further comprises the step of printing, as said third portion of said representation, a half-tone representation of said image.

4. A method of producing a gradient tonal representation of an image on a physical medium according to claim 3 wherein said first and second regions of said representation are printed using a black ink and wherein said gradient tonal representation is a gray scale representation.

5. A method of producing a gradient tonal representation of an image on a physical medium according to claim 3 wherein the ink used for printing said first and second portions of said representation is selected from the group consisting of black, yellow, cyan and magenta ink.

6. A method of producing a gradient tonal representation of an image on a physical medium according to claim 1 wherein said image is comprised of a plurality of pixels, further comprising the steps of:
   determining an intensity level for each one of said plurality of pixels; and
   assigning each one of said plurality of pixels to either said first region or said second region based upon said intensity level for that pixel.

7. A method of producing a gradient tonal representation of an image on a physical medium according to claim 6 wherein the step of assigning each one of said plurality of pixels to either said first region or said second region based upon said intensity level for that pixel further comprises the steps of:
   assigning each of said plurality of pixels to said first region if said intensity level for said pixel is within a first intensity level range for which a continuously variable level representation may be printed; and
   assigning each of said plurality of pixels to said second region if said intensity level for said pixel is within a first intensity level range for which a discretely variable intensity level representation may be printed.

8. A method of producing a gradient tonal representation of an image on a physical medium according to claim 7 wherein the step of printing a continuously variable intensity level portion of said representation for said first region of said image further comprises the step of printing, for each pixel element of said image located within said first region, a continuous tone representation of said pixel element, said continuous tone representation having an intensity selectable within said range of intensities for said continuously variable level portion.

9. A method of producing a gradient tonal representation of an image on a physical medium according to claim 6 wherein said representation is comprised of a plurality of pixels, each of which corresponds to one of said pixels of said image, and wherein the step of printing a continuously variable intensity level portion of said representation for said first region of said image further comprises the step of depositing a selected quantity of ink on said first and second portions of said physical medium such that each of said pixels of said first and second portions of said representation has an ink intensity level corresponding to said determined image intensity level for said corresponding one of said pixels of said first region of said image.

10. A method of producing a gradient tonal representation of an image on a physical medium according to claim 9 wherein the step of printing a discretely variable intensity level portion of said representation for said second region of said image further comprises the step of depositing ink on said third portion of said physical medium such that said third portion of said representation has an ink intensity level corresponding to said determined image intensity level for said region of said image.

11. A method of producing a gradient tonal representation of an image on a physical medium according to claim 10 wherein the step of depositing ink on said third portion of said physical medium such that said third portion of said representation has an ink intensity level corresponding to said determined image intensity level for said second region of said image further comprises the step of depositing a spot of ink having a first diameter on selected ones of said pixels of said second portion of said representation, a spot of ink having a second diameter on others of said pixels of said second portion of said representation and no ink on still others of said pixels of said second portion of said representation such that said second portion of said representation has said desired ink intensity level.

12. A method of producing, on a physical medium, a gradient tonal representation comprised of a plurality of pixels of an image comprised of a corresponding plurality of pixels, comprising the steps of:
   determining an image intensity level for each one of said plurality of pixels of said image;
   assigning respective pixels of said representation to first portions of said representation if said image intensity levels for said corresponding pixels of said image are within a first image intensity level range;
   assigning respective pixels of said representation to second portions of said representation if said image intensity levels for said corresponding pixels of said image are within a second image intensity level range;
   assigning respective pixels of said representation to third portions of said representation if said image intensity levels for said corresponding pixels of said image within a third image intensity level range;
   selecting, from a first continuously variable range of quantities, respective first quantities of ink to be deposited on pixel locations of said first portions of said representation, each selected quantity dependent on the intensity level of the corresponding pixel;
   generating first continuous tone portions of said representation by depositing said selected quantities of ink at respective pixel locations of said first portions of said representation such that each of said pixels of said first portions of said representation has an ink intensity level which approximately matches said image intensity level determined for said corresponding pixel of said image;
   selecting, from said pixels of said second portions of said representation, pixels to have ink deposited thereon;
   selecting, from discrete quantities within a predetermined range, a second quantity of ink to be deposited on selected pixels of said second portions of said representation;
   generating half-tone portions of said representation by depositing said second selected discrete quantities of ink on said selected pixel locations of said second portions of said representation such that each of said second portions of said representation has an ink intensity level which approximately matches said image intensity level determined for a corresponding portion of said image;
   selecting, from a second continuously variable range of quantities, respective third quantities of ink to be deposited on pixel locations of said third portions of said representation, each selected quantity dependent on the intensity level of the corresponding pixel; and
   generating second continuous tone portions of said representation by depositing said selected quantities of ink at respective pixel locations of said third portions of said representation such that each of said pixels of said third portions of said representation has a discretely variable intensity level which approximately matches said image intensity level determined for said corresponding pixel of said image, wherein the quantity of ink is deposited on the physical medium in at least two applications at each corresponding location of said third portions.

13. A method of producing a gradient tonal representation of an image on a physical medium according to claim 12 wherein the step of depositing said selected quantity of ink on each said selected pixel of said second portions of said representation such that said each second portion of said representation has an ink intensity level which approximately matches said image intensity level for a corresponding portion of said image further comprises the step of depositing a spot of ink having a first diameter on certain ones of said selected pixels of said second portions of said representation, depositing a spot of ink having a second diameter on others of said selected pixels of said second portions of said representation and depositing no ink on said unselected pixels.

14. A method of producing a gradient tonal representation of an image on a physical medium according to claim 13 and further comprising the step of producing a gray scale representation by selecting a black ink for generating said continuous tone and said half-tone portions of said representation.

15. A method of producing a gradient tonal representation of an image on a physical medium according to claim 13 and further comprising the step of selecting said ink from the group consisting of black, yellow, cyan and magenta ink.

16. A method of producing a gradient tonal representation of an image on a physical medium using ink dot printing, comprising the steps of:

printing continuous tone representations of image areas having intensities within a first defined intensity level range by forming at respective dot locations, ink dots each having an intensity level that is selectively and continuously variable over a range representing said first defined intensity level range, by adjusting individual dot sizes within a continuous range d1 to d2 and at each dot location forming a defined plurality of dots;

printing continuous tone representations of image areas having intensities within a second defined intensity level range by forming at respective dot locations, ink dots each having an intensity level that is selectively and continuously variable over a range representing said second defined intensity level range, by adjusting individual dot sizes within a continuous range d3 to d4 and forming at each dot location a number of dots less than said defined plurality of dots;

printing non-continuous tone representations of image areas having intensities within a third intensity level range intermediate the first and second intensity level ranges by forming at respective dot locations, ink level ranges by forming at respective dot locations, ink dots each having a size selected from a predetermined number of discrete size values that are either not greater than d1 or not less than d3;

wherein, in sequence, said first, third and second intensity level ranges represent image areas of increasing intensity levels and the dot size images increase from d1 to d2 to d3 to d4.

17. A method according to claim 16, wherein ink dots having sizes of either d1 or d3 are used to print representations of image areas having intensities within said third intensity level range.

18. A method according to claim 16, including the further step of printing non-continuous tone representations of image areas having intensities within a fourth intensity level range of intensities that are higher than said second range of intensity levels, by forming at each dot location either no ink dot or an ink dot having a single predetermined size;

wherein, in sequence, said first, third, second, and fourth intensity level ranges represent image areas of increasing intensity levels and the dot size images increase from d1 to d2 to d3 to d4.

19. A method according to claim 18, wherein during printing of image areas having intensities within said fourth intensity level range either no ink dot or an ink dot having a size equal to d4 is formed at each dot location.

20. A method according to claim 18, wherein half tone representations are produced of image areas having intensities within each of said third and fourth intensity level range.

21. A method according to claim 18, wherein ink dots having sizes of either d1 or d3 are used to print representations of image areas having intensities within said third intensity level range; and wherein during printing of image areas having intensities within said fourth intensity level range either no ink dot or an ink dot having a size equal to d4 is formed at each dot location.

22. A method according to claim 16, wherein two ink dots are formed successively at each dot location during printing of continuous tone representations having intensities within said first defined intensity level range; and wherein a single ink dot is formed at each dot location during printing of continuous tone representations having intensities within said second defined intensity level range.

23. A method according to claim 16, wherein the intensity levels of said ink dots are controlled by actuating voltage levels and/or durations applied to a printhead for controlling the sizes of the ink dots according to the volume of ink used to produce each said ink dot, wherein the intensity levels of said continuously variable intensity level ink dots are controlled by selecting corresponding voltage levels and/or durations within a continuously variable range, and the intensity levels of said ink dots having selected discrete intensity level values are controlled by switching a voltage level and/or duration between a predetermined number of discrete values.

* * * * *